United States Patent
Weigert et al.

(10) Patent No.: US 9,452,722 B2
(45) Date of Patent: Sep. 27, 2016

(54) INDUCTION POWERED PANELS

(71) Applicant: GM GLOBAL TECHNOLOGY OPERATIONS LLC, Detroit, MI (US)

(72) Inventors: Norman J. Weigert, Whitby (CA); Chris J. T. Wisniewski, Oshawa (CA); Paul R. Dynes, Boise, ID (US); Tanner E. Goeson, Bowmanville (CA); Thomas D. Hagen, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/789,225

(22) Filed: Jul. 1, 2015

(65) Prior Publication Data

US 2015/0298629 A1    Oct. 22, 2015

Related U.S. Application Data

(63) Continuation-in-part of application No. 13/686,764, filed on Nov. 27, 2012, now Pat. No. 9,240,276.

(51) Int. Cl.
| | |
|---|---|
| *B60R 16/03* | (2006.01) |
| *H04B 5/00* | (2006.01) |
| *H01F 38/14* | (2006.01) |

(52) U.S. Cl.
CPC .............. *B60R 16/03* (2013.01); *H01F 38/14* (2013.01); *H04B 5/0037* (2013.01)

(58) Field of Classification Search
CPC ... B60R 25/042; B60R 25/08; B60R 25/045; B60R 25/1018; B60R 16/03; B60R 16/0315; B60R 16/04; B60R 21/017; B60R 25/04; B60Q 1/1423; B60Q 2300/314; B60Q 1/143; B60Q 1/1415; B60Q 2300/42; B60Q 3/0293; B60Q 11/005; B60Q 1/387; B60Q 1/2603; B60Q 3/048; B60L 11/182; B60L 11/14; H01F 38/14; Y02T 10/7005; Y02T 10/7072; Y02T 90/122; Y02T 90/14; Y02T 10/7077; H04B 5/0037; H02J 7/1438
USPC .............. 307/9.1, 10.1; 315/82, 77; 180/287
See application file for complete search history.

(56) References Cited

U.S. PATENT DOCUMENTS

| | | | |
|---|---|---|---|
| 2,944,145 A | 7/1960 | Legge | |
| 2,976,495 A | 3/1961 | Unger | |
| 4,063,517 A | 12/1977 | Nardozzi, Jr. | |
| 4,630,043 A | 12/1986 | Haubner et al. | |
| 6,222,443 B1* | 4/2001 | Beeson | B60D 1/065 307/10.1 |
| 7,543,842 B1* | 6/2009 | Fiorini | B62B 3/025 280/43 |
| 7,769,346 B1* | 8/2010 | Van Order | B60R 11/0264 307/10.1 |
| 7,901,215 B1* | 3/2011 | Galgoci | B60Q 1/0088 307/10.1 |
| 2002/0056233 A1 | 5/2002 | Gohara | |
| 2002/0117368 A1 | 8/2002 | Ogasawara | |
| 2002/0117897 A1 | 8/2002 | Takahashi | |
| 2002/0182898 A1 | 12/2002 | Takahashi et al. | |
| 2004/0005809 A1 | 1/2004 | Suzuki | |
| 2004/0134128 A1 | 7/2004 | Berry et al. | |
| 2004/0262938 A1* | 12/2004 | Bruford | B62D 33/0273 296/50 |

(Continued)

*Primary Examiner* — Jared Fureman
*Assistant Examiner* — Brian K Baxter
(74) *Attorney, Agent, or Firm* — Cantor Colburn LLP

(57) ABSTRACT

A vehicle includes a movable panel having an electronic device; a power source; a data source; and a connector configured to selectively couple the movable panel to the vehicle. The connector is configured to be electrically coupled to the power source and the data source, and is further configured to inductively couple the electronic device of the movable panel to the power source and the data source.

12 Claims, 8 Drawing Sheets

(56) References Cited

U.S. PATENT DOCUMENTS

| | | |
|---|---|---|
| 2005/0115151 A1 | 6/2005 | Gevay |
| 2005/0280274 A1* | 12/2005 | Devitt ................. B60P 1/433 296/61 |
| 2007/0102999 A1* | 5/2007 | Darraba ............... B60N 2/002 307/10.1 |
| 2007/0210614 A1* | 9/2007 | Chandler ............ B62D 63/062 296/182.1 |
| 2008/0272649 A1* | 11/2008 | Order ................. B60R 16/0215 307/10.1 |
| 2010/0320808 A1 | 12/2010 | Marx et al. |
| 2011/0140479 A1 | 6/2011 | Okada et al. |
| 2012/0032632 A1 | 2/2012 | Soar |
| 2013/0107045 A1* | 5/2013 | Soderlind ................ B60R 1/04 348/148 |
| 2013/0278053 A1* | 10/2013 | Bauer .................... H02J 5/005 307/9.1 |

* cited by examiner

INDUCTION POWERED PANELS

CROSS REFERENCE TO RELATED APPLICATIONS

This application is a continuation-in-part application of U.S. application Ser. No. 13/686,764 filed Nov. 27, 2012, which is hereby incorporated by reference in its entirety.

FIELD OF THE INVENTION

The subject invention relates to vehicles, and more particularly relates to systems for inductively powering panels in vehicles.

BACKGROUND

Vehicles are increasingly becoming more complicated as more and more technology is included into vehicles. Each electronic device in the vehicle has to be coupled to a power source. The electronic devices are often coupled to a power source by a direct mechanical connection, such as a wire. However, when the electronic devices are in a panel which is moveable, such as a door or trunk, or removable, such as a removable roof top, the direct wired connections can complicate the installation process.

SUMMARY OF THE INVENTION

In one exemplary embodiment of the invention a vehicle includes: a movable panel having an electronic device; a power source; a data source; and a connector configured to selectively couple the movable panel to the vehicle. The connector is configured to be electrically coupled to the power source and the data source, and is further configured to inductively couple the electronic device of the movable panel to the power source and the data source.

In another exemplary embodiment of the invention, a connector is adapted to selectively couple a moveable panel having an electronic device to a vehicle having a power source and a data source. The connector includes a first connecting element adapted to be coupled to the vehicle, the first connecting element having a first coil adapted to inductively couple the electronic device to the power source and the data source, and a first modulator-demodulator disposed in signal communication with the first coil and adapted to receive power from the power source and data from the data source. The connector further includes a second connecting element adapted to be coupled to the moveable panel, the second connecting element having a second coil adapted to inductively couple the electronic device to the power source and the data source, and a second modulator-demodulator disposed in signal communication with the second coil and adapted to provide power and data to the electronic device.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
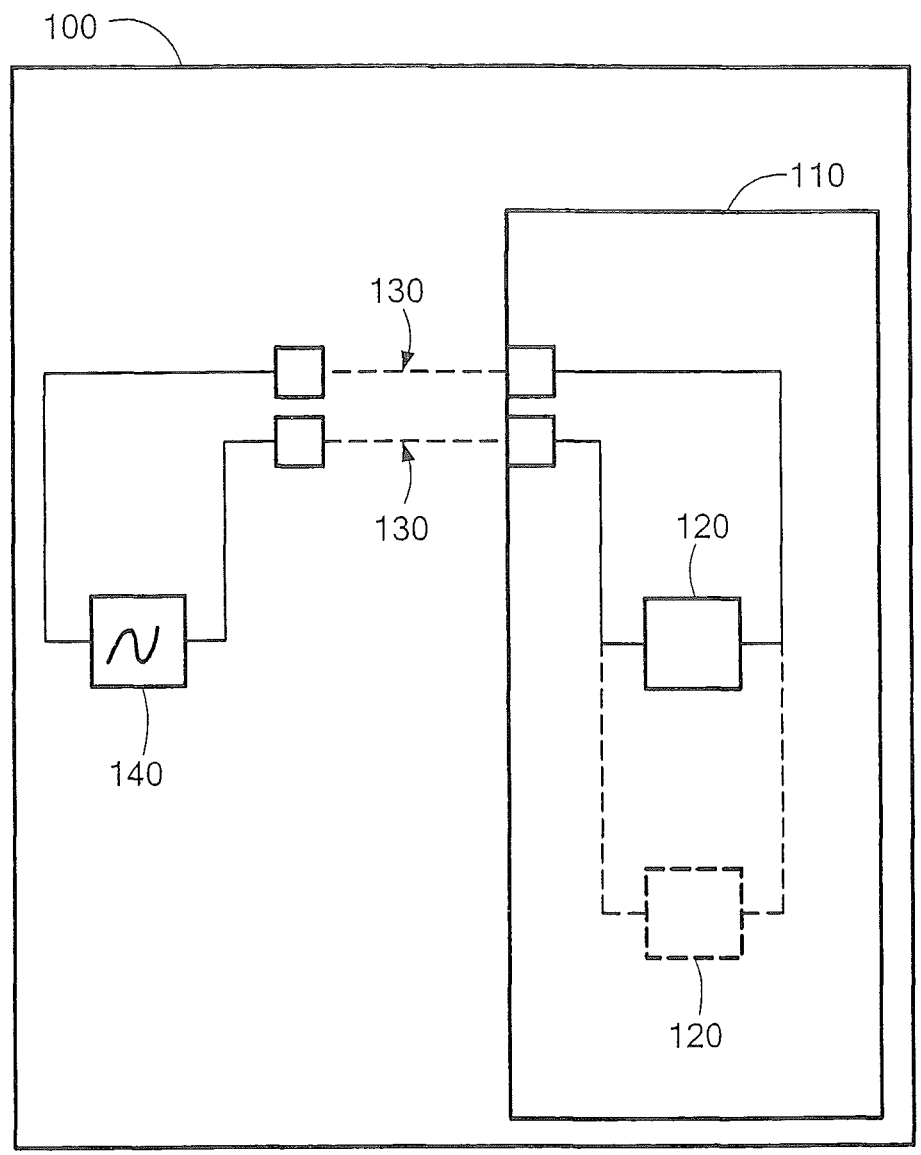
FIG. 1 is a block diagram of a vehicle, in accordance with an embodiment.

The following description is merely exemplary in nature and is not intended to limit the present disclosure, its application or uses. It should be understood that throughout the drawings, corresponding reference numerals indicate like or corresponding parts and features.

Modern vehicles have a variety of movable and removable parts such as doors, tailgates, trunks, hoods and roofs. Many of the movable and removable parts house electronic devices, such as lights, back-up cameras, proximity sensors or displays, or electronic systems such as switches or motors for windows or locks. As discussed in further detail below, a system for inductively powering and communicating with the electronic devices and systems is introduced. The inductive power/communication system simplifies the assembly and maintenance of the vehicle and simplifies a process for removing and reattaching removable panels, such as a removable roof panel or tailgate, which have an electronic device.

FIG. 1 is a block diagram of a vehicle 100, in accordance with an embodiment. The vehicle 100 may be any type of vehicle, including, but not limited to, automobiles, aircraft, spacecraft, marine vehicles, or the like. The vehicle 100 includes at least one moveable panel 110. The moveable panel 110 may be, for example, a door, a trunk, a hood, a tailgate, a lift gate, a convertible top, a headrest or the like. In one embodiment, for example, the moveable panel 110 may be removable from the vehicle 100 entirely. For example, the moveable panel 110 may be a removable tailgate, a roof panel, or a removable headrest.

The moveable panel 110 includes at least one electronic device 120. The electronic device 120 may be any device which requires electricity. In one embodiment, for example, if the moveable panel 110 is a removable roof panel or a convertible top, the electronic device 120 may be a dome light. In other embodiments, for example, if the moveable panel 110 is a door, the electronic device 120 may be a motor and control system for controlling the movement of a window in the door or an electronic door locking system. The electronic device 120 could also be a brake light, an electro-polymer sunshade, an electrochromic device, a suspended particle device or liquid crystal display (LCD). In yet other embodiments, for example, the electronic device 120 may be a defrosting system. In yet another embodiment, for example, the electronic device 120 may be a back-up camera or a proximity sensor, or a combination of a back-up camera and a plurality of proximity sensors, which is discussed in more detail below in connection with FIG. 7.

The moveable panel 110 is coupled to the vehicle 100 by at least one connector 130. Each connector 130 has two connecting elements, one connected to the vehicle 100 and one connected to the moveable panel 110. The connectors 130 are used to couple the movable panel 110 to the vehicle 100 and to provide power, and in some embodiments data communication (discussed further below), for the electronic device 120. Each connector 130 is coupled to a power source 140 on the vehicle 100. The power source 140, for example, could be a battery-powered inverter, or the power could be supplied by a motor on the vehicle 100, or a combination thereof. One of the connectors 130 is coupled to a first side of the power source 140 and the other connector is coupled to a second side of the power source 140. Accordingly, when the moveable panel 110 is coupled to the vehicle 100, a complete circuit is formed, allowing the transfer of current, as discussed in further detail below. Many different styles of connectors 130 could be used. In one embodiment, for example, a hinge may be used as the connector. The hinge, for example, may connect a door, a tailgate, or a trunk (individually herein also referred to as a movable or removable panel 110) to the vehicle 100.

Figure 2:
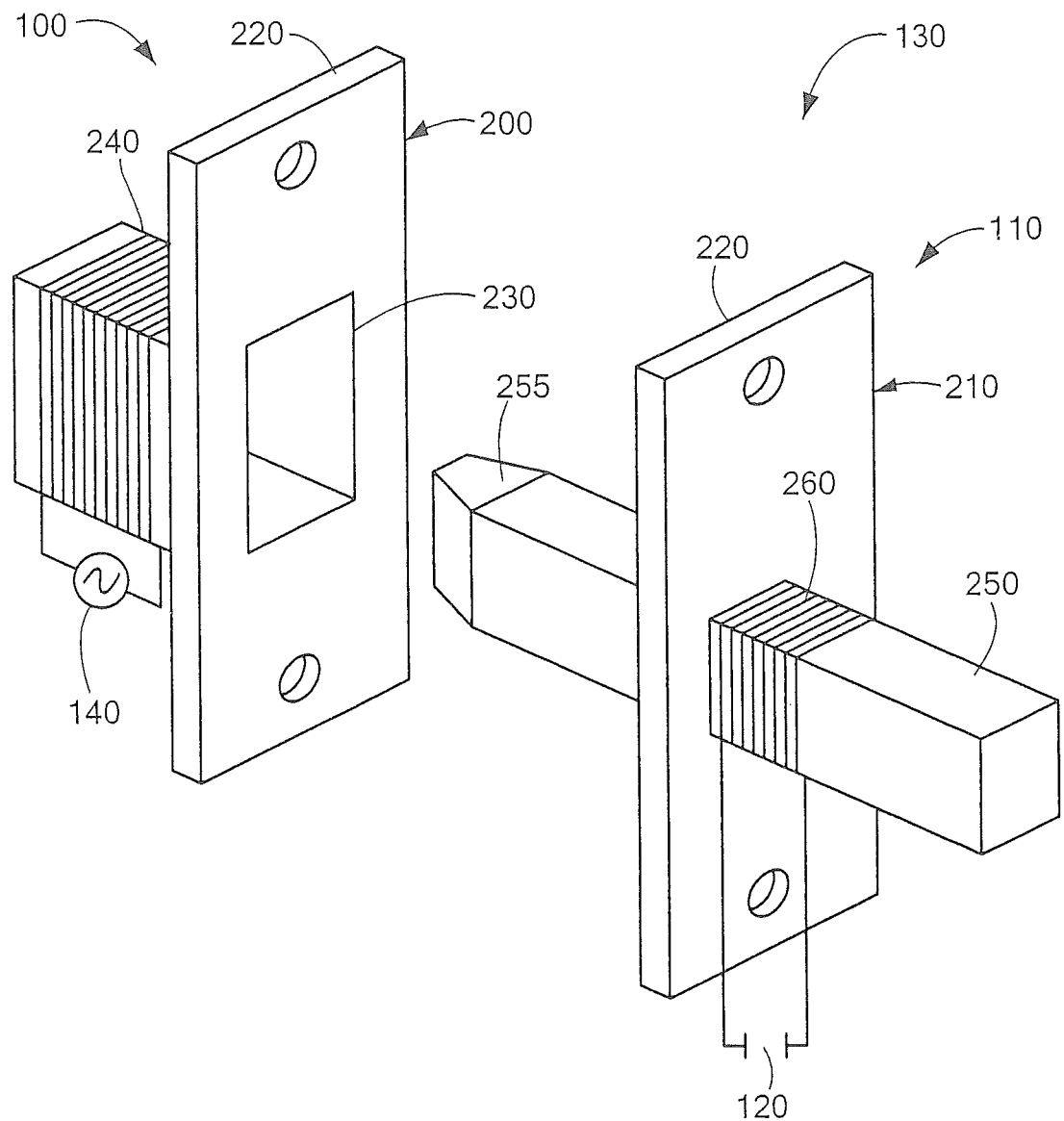
FIG. 2 is a perspective view of an exemplary connector in accordance with an embodiment.

FIG. 2 is a perspective view of an exemplary connector 130 in accordance with an embodiment. The connector 130 includes a connecting element 200 coupled to the vehicle 100 and a connecting element 210 coupled to the moveable panel 110. In one embodiment, for example, the connecting elements 200 and 210 may be coupled to the vehicle 100 and the movable panel 110 via one or more mounting elements 220. The mounting elements 220, for example, may be coupled to the vehicle 100 or moveable panel 110 via screws via one or more holes in a face of the mounting elements 220. In other embodiments, for example, the connecting elements 200, 210 may be welded, press fit, or connected to the respective vehicle 100 or moveable panel 110 in any other fashion.

The connecting element 200 includes a receptacle 230. While the receptacle 230 illustrated in FIG. 2 is substantially rectangular, one of ordinary skill in the art would recognize that the receptacle 230 could be shaped in a variety of ways, including, but not limited to, circular, oval, square or any other polygon. The receptacle 230 extends away from the mounting element 220 of the connecting element 200. A coil 240 is wound around the receptacle 230. The coil 240 may be formed by a wire made of any conductive material. The coil 240 is connected to a power source, such as the power source 140 illustrated in FIG. 1, as discussed in further detail below.

The connecting element 210 includes an interface 250. The interface 250 is configured to couple with the receptacle 230. Accordingly, the shape of the interface 250 corresponds to a shape of the receptacle 230. In one embodiment, for example, an end 255 of the interface 250 may be tapered to ease the coupling between the connecting elements 200 and 210. In other embodiments, for example, the end 255 may include a hook, or other mechanism for securing the connecting element 210 to the connecting element 200. The interface 250 may be made from any ferrous material, including, but not limited to, iron, steel or any other alloy which includes iron.

The connecting element 210 also has a coil 260 wrapped around a portion of the interface 250. The coil 260 is coupled to one or more electronic devices 120. When power is applied to the coil 240 from a power source 140, the coil 240 and coil 260 inductively couple via the ferrous interface 250. In other words, a current flowing through the coil 240 induces a current in the coil 260, which can be used to power the electronic devices 120. Because the power for the electronic devices 120 is passed to the movable panel 110 inductively rather than via wires, the assembly of the panel 110 to the vehicle 100 is greatly simplified. Further, because the power for electronic devices 120 is passed inductively, the moveable panels 110 can be removed from the vehicle 100 and later reinstalled on the vehicle 100 without having to worry about a wire harness. Furthermore, unlike certain mechanical connections which need to be precise and which are subject to corrosion, the position of the coils 240 and 260 with respect to one another does not have to be precise to function.

While FIG. 2 illustrates a vehicle 100 having a connecting element 200 with a receptacle 230 and a moveable panel 110 having a connecting element 210 with an interface 250, one of ordinary skill in the art would recognize that the configuration can be reversed.

Figure 3:
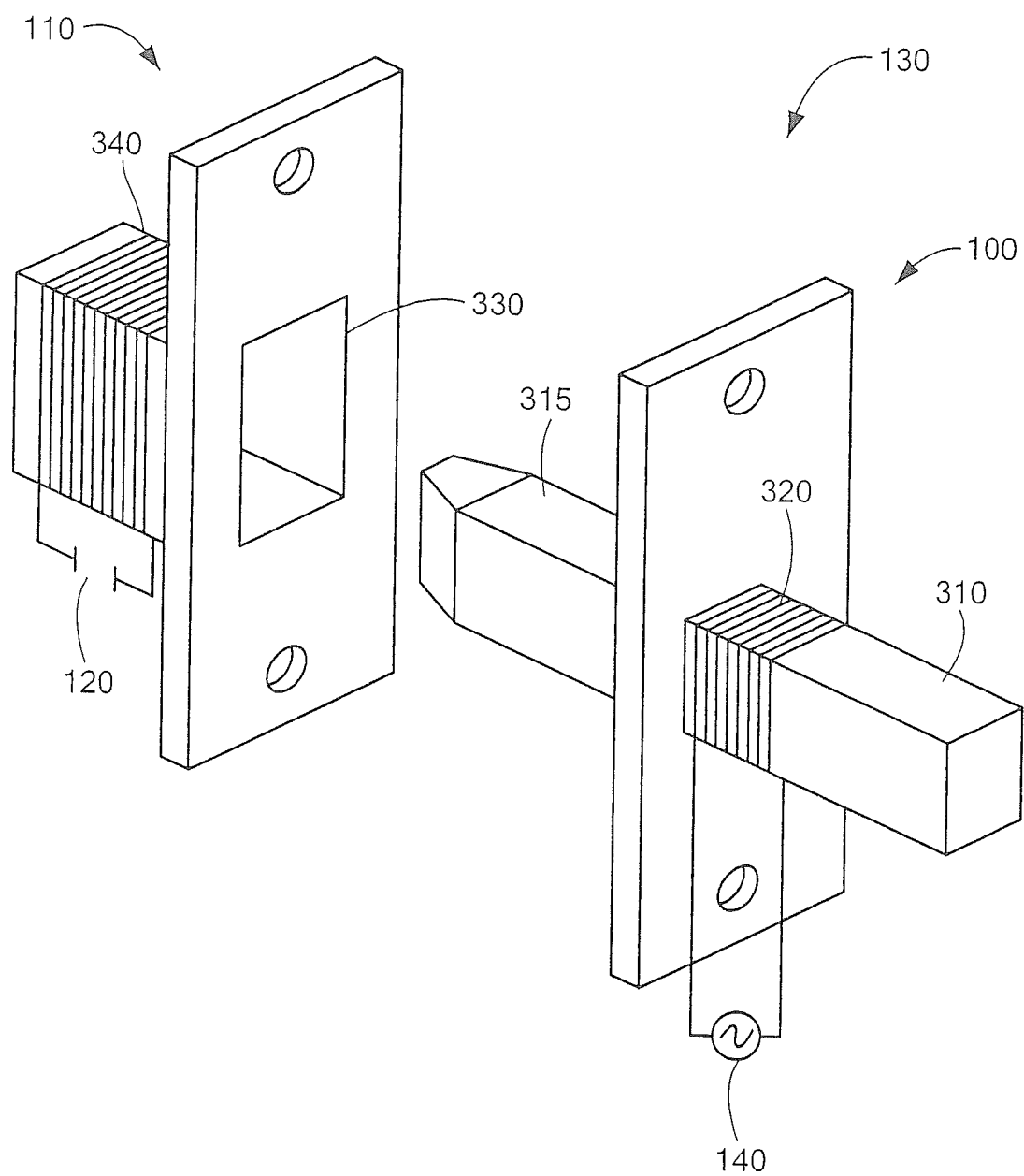
FIG. 3 is a perspective view of another exemplary connector in accordance with an embodiment.

FIG. 3 is a perspective view of another exemplary connector 130 in accordance with an embodiment. As seen in FIG. 3, the vehicle 100 includes a connecting element 310 having an interface 315 with a coil 320. The coil 320 is coupled to a power source in the vehicle. The moveable panel 110 includes a receptacle 330 having a coil 340 coupled to one or more electronic devices 120.

Figure 4:
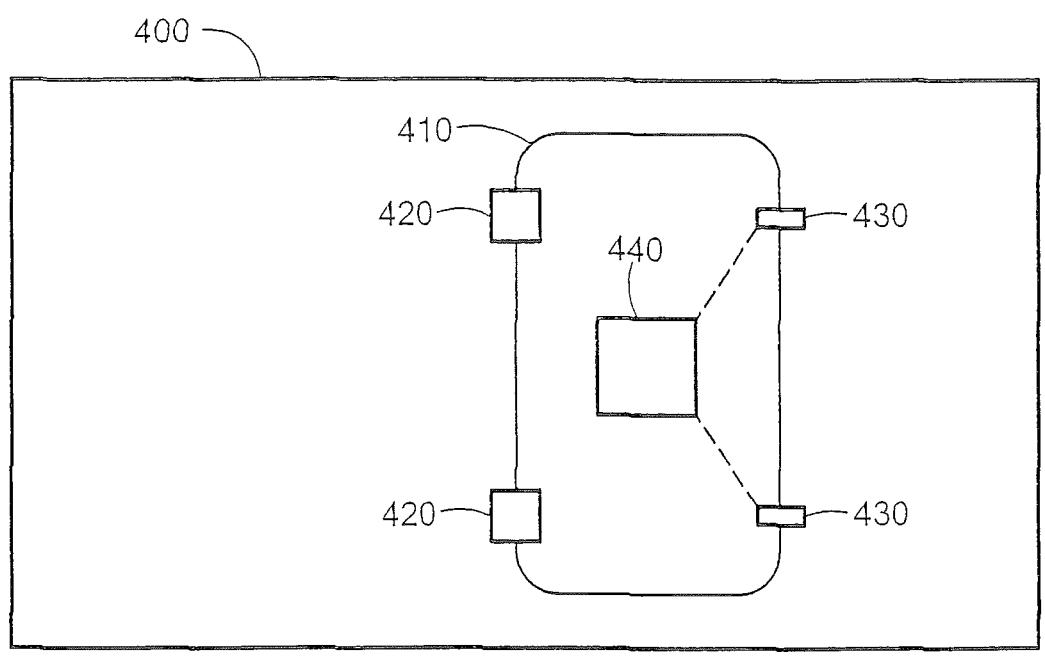
FIG. 4 illustrates an exemplary vehicle in accordance with an embodiment.

FIG. 4 illustrates an exemplary vehicle 400 in accordance with an embodiment (synonymous with vehicle 100 depicted in FIG. 1, for example). The vehicle 400 includes a removable roof panel 410. The removable roof panel 410 can be removed from the vehicle to convert the vehicle into a convertible. The vehicle 400 includes at least one locking mechanism 420 and at least one connector 430 which couple the removable roof panel 410 to the vehicle 400. The vehicle 400 further includes at least one electronic device 440.

Figure 5:
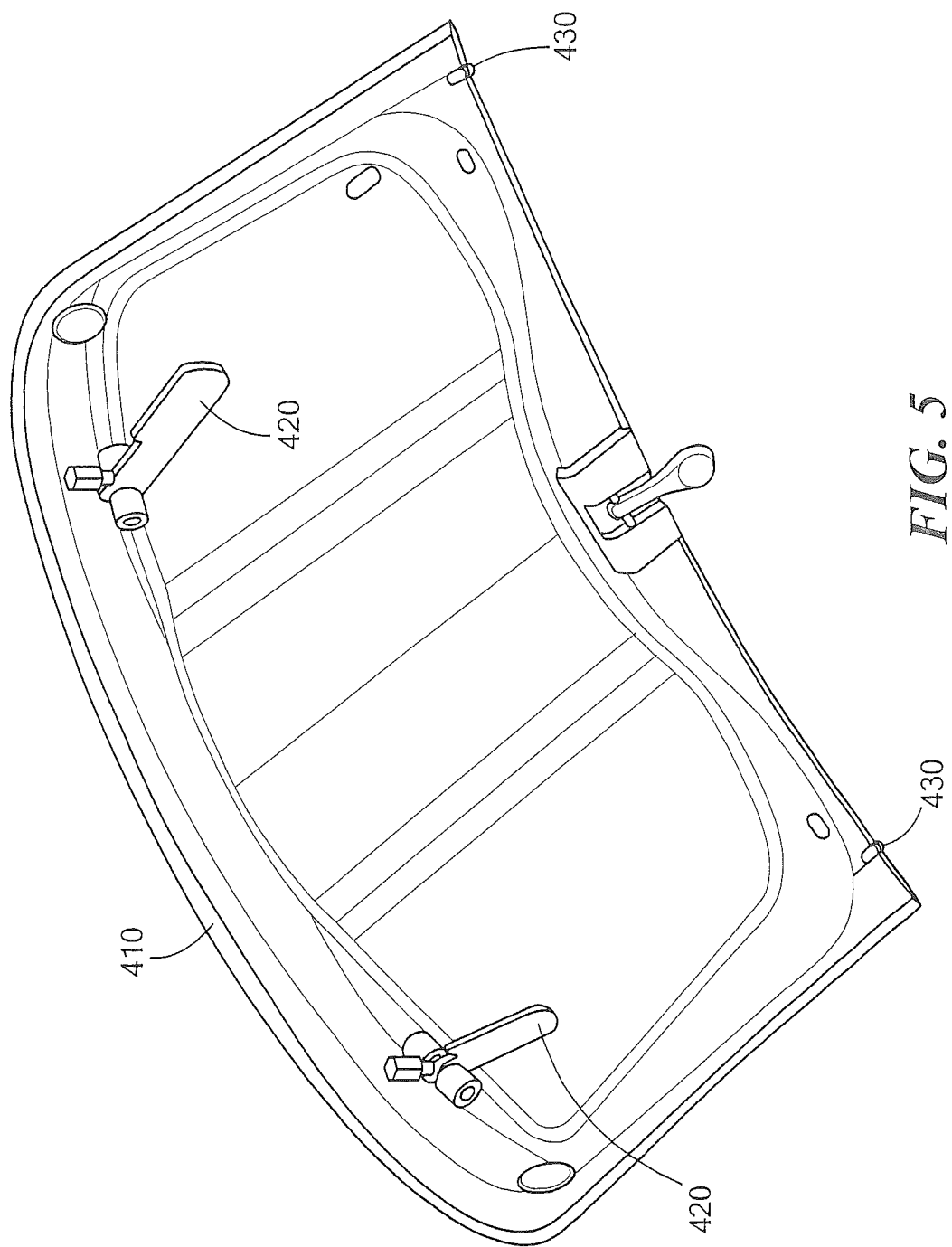
FIG. 5 is a perspective view of exemplary removable roof panel in accordance with an embodiment.

FIG. 5 is a perspective view of exemplary removable roof panel 410 in accordance with an embodiment. As discussed above, the removable roof panel 410 includes at least one locking mechanism 420 and at least one connector 430 which couples the removable roof panel 410 to the vehicle 400. In this exemplary embodiment, the locking mechanism 420 is a rotatable latch than can manually be rotated around an axis to hold the removable roof panel 410 in place on the vehicle 400 or to unlock the removable roof panel 410 from the vehicle 400.

The connector 430 functions as both a guide pin and for inductively transferring power. When the removable roof panel 410 is connected to the vehicle 400, the connector 430 ensures that the removable roof panel 410 is aligned properly, ensuring that the removable roof panel 410 is properly seated on the roof of the vehicle 400 and that the locking mechanism 420 is aligned with corresponding area or areas on the vehicle 400.

Figure 6:
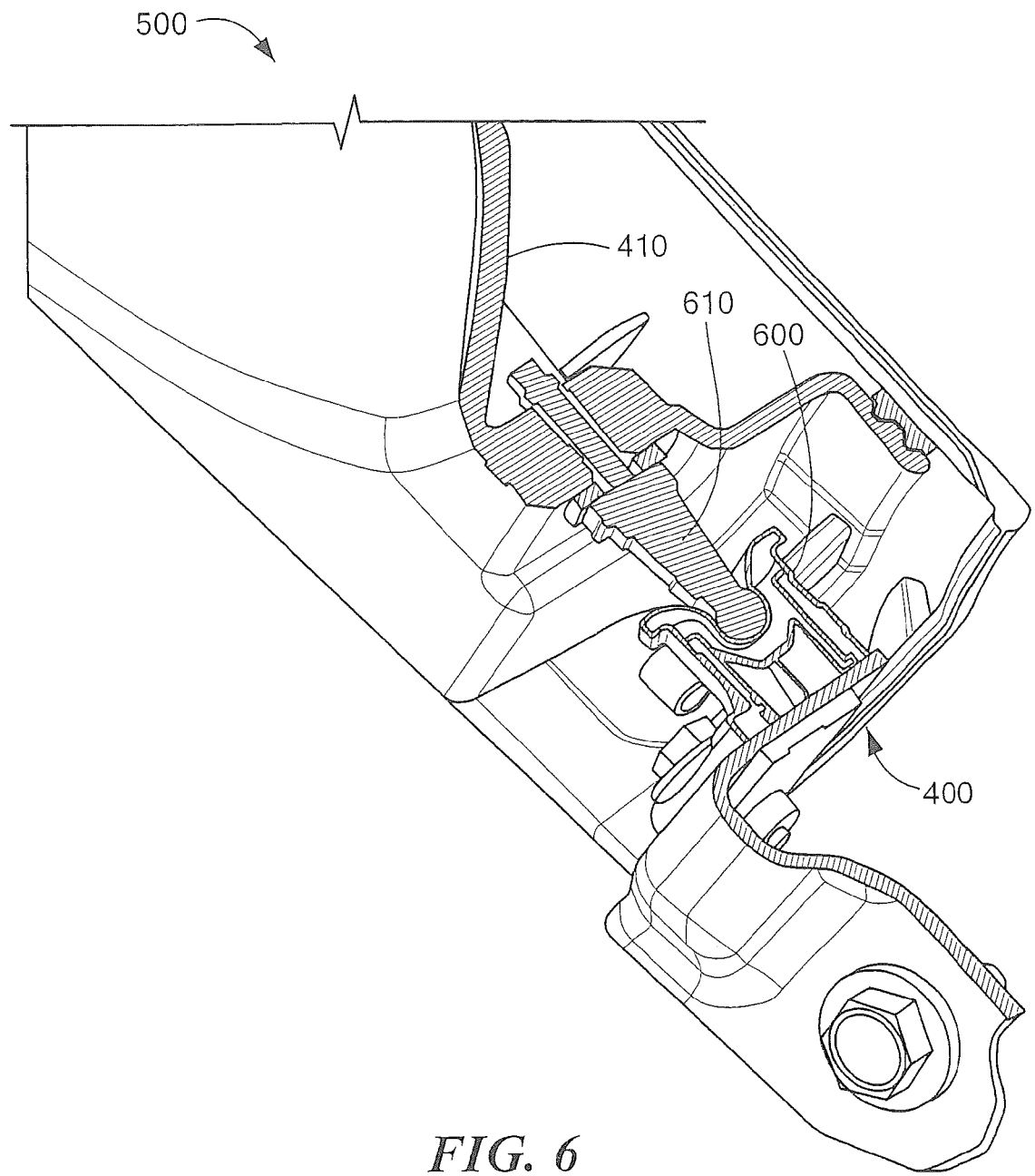
FIG. 6 is a cutaway view of the exemplary connector illustrated in FIGS. 4 and 5.

FIG. 6 is a cutaway view of an exemplary connector 500, synonymous with connector 430 illustrated in FIGS. 4 and 5. The connector 500 includes a connecting element 600 coupled to the vehicle 400 and a connecting element 610 coupled to the removable roof panel 410. As seen in FIG. 6, in this embodiment the connecting element 600 is substantially bowl shaped, with a tapered entry to help guide the connecting element 610 into the correct position. In one embodiment, for example, the connecting element 610 has a rounded front end. The rounded front end, as illustrated in FIG. 6, helps the connecting element 610 slide into the correct position within the connecting element 600. In one embodiment, for example, the connecting element 610 may include a ferrous material. Furthermore, a coil (not illustrated, but described in detail above) may be wrapped around each of the respective connecting elements 600 and 610. In one embodiment, for example, the coil wrapped around the connecting element 610 may be covered in a protective coating to prevent the coil from becoming damaged when the connecting elements are coupled. Accordingly, when the connecting elements 600 and 610 are coupled together, the coils can inductively couple providing power to an electronic device.

Figure 7:
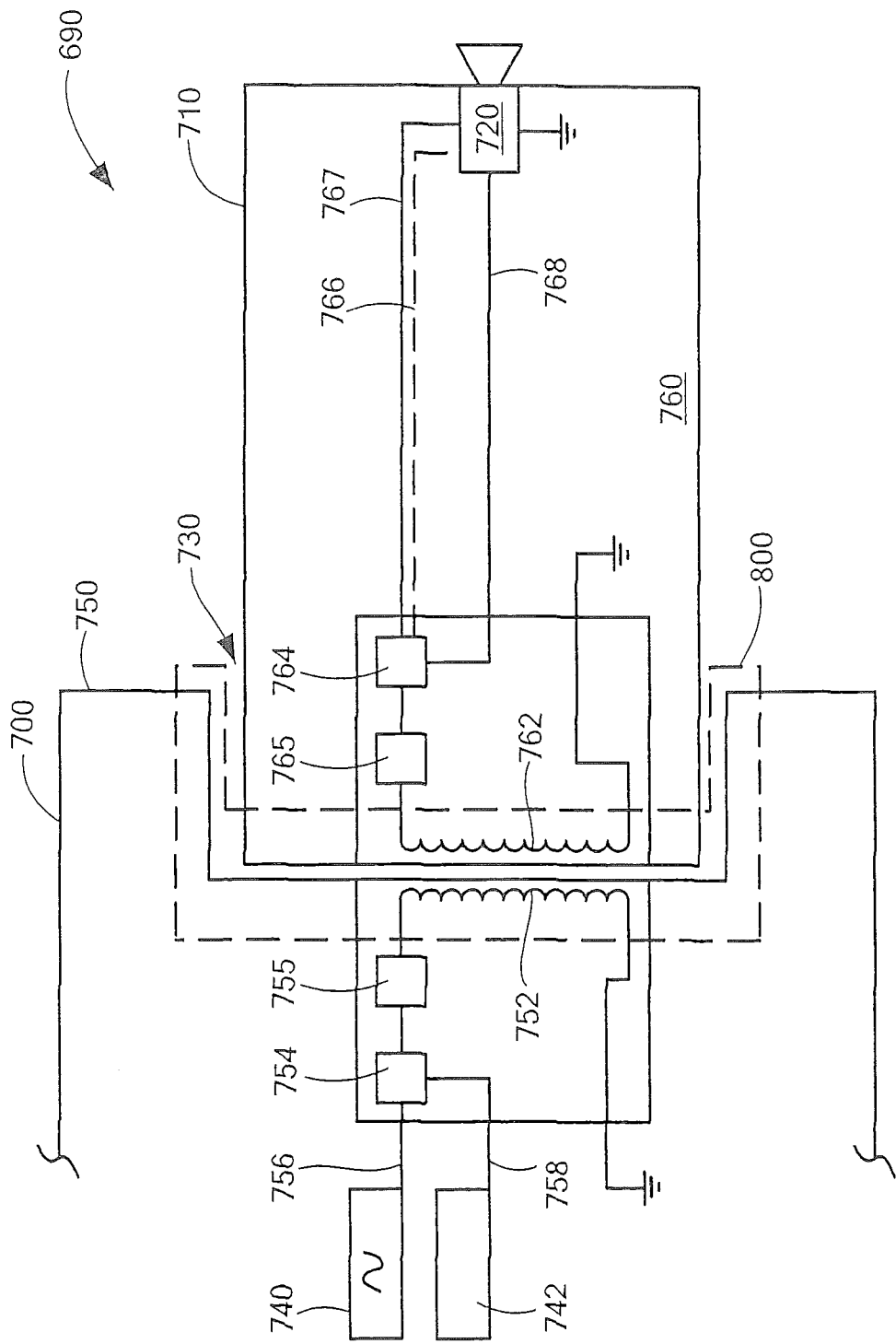
FIG. 7 is a schematic circuit of another connector in accordance with an embodiment of the invention.

FIG. 7 depicts a schematic circuit 690 of another embodiment of the invention that includes both inductively coupled power and inductively coupled data communication between a vehicle 700 and a movable or removable panel 710 via a connector 730. Similar to the connector 130 depicted in FIGS. 1 and 2, connector 730 is configured to inductively provide power to an electronic device 720. However, in addition to power, connector 730 is further configured to inductively provide data communication to the electronic device 720. In an embodiment, the vehicle 700 includes a movable, or removable, panel 710, such as a tailgate for example, having an electronic device 720, such as a back-up camera and/or proximity sensors for example, or any other electronic device or electronic system suitable for a purpose as herein disclosed. The connector 730 is configured to selectively couple the movable panel 710 to the vehicle 700, is configured to be electrically coupled to a power source 740 and a data source 742, and is further configured to inductively couple the electronic device 720 of the movable panel 710 to the power source 740 and the data source 742. In an embodiment, the movable or removable panel 710 is pivotally attached to the vehicle 700 via a hinge 800, and the connector 730 is disposed at the hinge 800.

Similar to connector 130, connector 730 has a first connecting element 750 coupled to the vehicle 700, a first coil 752 wrapped around the first connecting element 750, a second connecting element 760 coupled to the moveable panel 710, and a second coil 762 wrapped around the second connecting element 760. In an embodiment the second coil 762 is wrapped around a ferrous portion of the second connecting element 760, similar to that discussed above in connection with ferrous interface 250 of connecting element 210, for inducing a current flow in the second coil 762. In addition, for data communications, connector 730 has a first modulator-demodulator 754 disposed in signal communication with the first coil 752, and disposed to receive power from the power source 740 and data from the data source 742 via power line 756 and data line 758, respectively, and a second modulator-demodulator 764 disposed in signal communication with the second coil 762, and disposed to provide power and data to the electronic device 720 via power line 767 and data line 768, respectively. In an embodiment, power line 767 and data line 768 may be combined into a single power/data line 766.

To amplify a data signal sent to the first coil 752, a first amplifier 755 is disposed in signal communication with the first modulator-demodulator 754 and the first coil 752, and to amplify a data signal received by the second coil 762 and sent to the electronic device 720, a second amplifier 765 is disposed in signal communication with the second modulator-demodulator 764 and the second coil 762.

Figure 8:
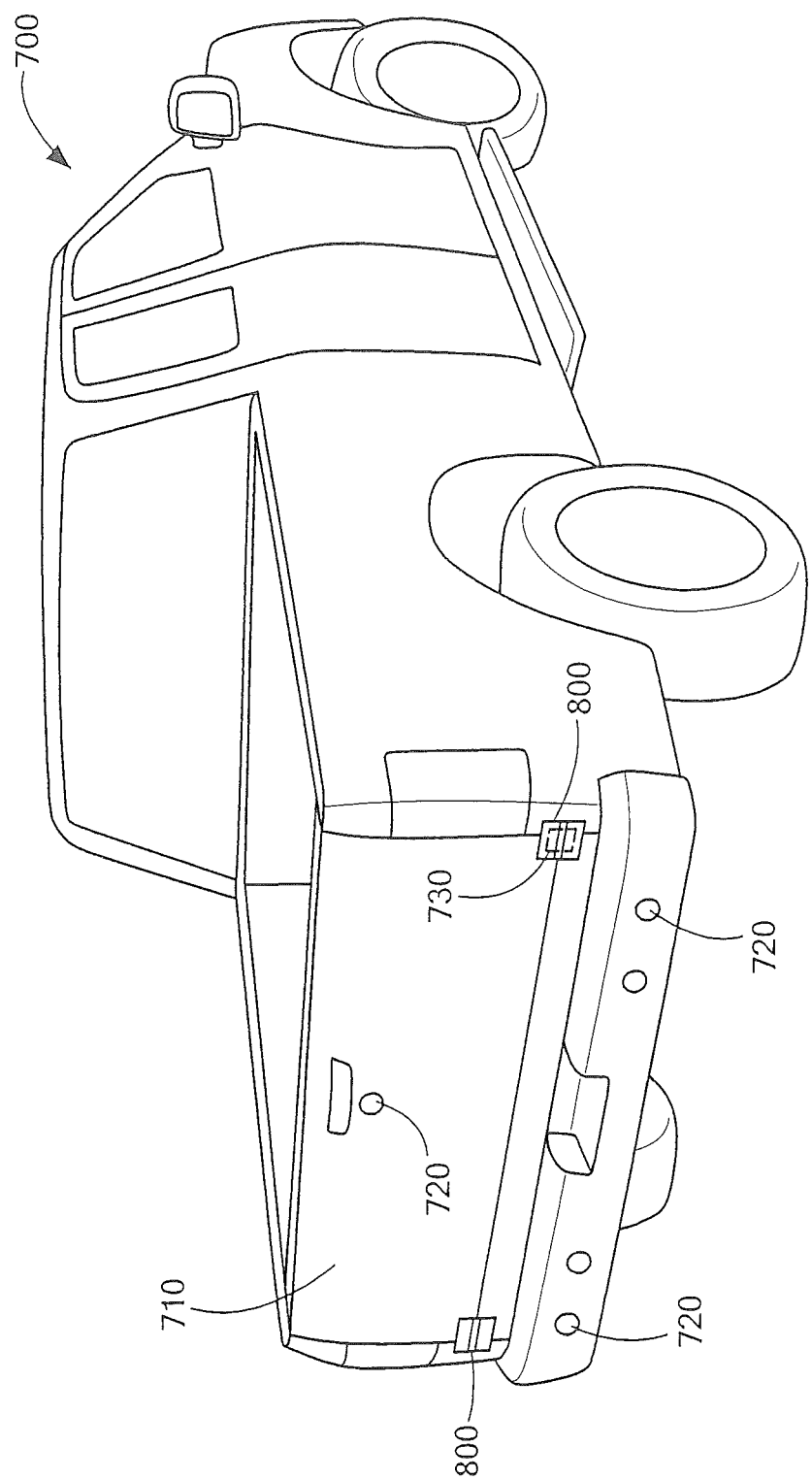
FIG. 8 depicts an example vehicle for use in accordance with an embodiment of the invention.

With reference now to FIG. 8, an embodiment of the invention includes a truck as the vehicle 700 having a tailgate as the removable panel 710, the tailgate 710 having a back-up camera and a plurality of proximity sensors as the electronic device 720, where power and data communication to the camera and sensors, collectively referred to by reference numeral 720, are inductively provided via a connector 730 disposed at a hinge 800 that pivotally attaches the tailgate 710 to the truck 700.

While embodiments of the invention have been described and illustrated herein having an inductive connector 730 disposed at a hinge 800 of a removable panel 710, it will be appreciated that the scope of the invention is not so limited, as the connector 730 may be disposed at any location suitable for a purpose disclosed herein, such as at a latch or locking mechanism that holds the movable/removable panel to the vehicle, or at a location other than a hinge or latch.

While certain embodiments have been described and depicted having a particular electronic device 120, 440, 720, for example, it will be appreciated that the scope of the invention is not so limited and encompasses any type of electronic device that falls within the scope of the appended claims, such as but not limited to Lidar, Radar, Ultrasonic, Laser, Smart sensor, Smart actuator, Night Vision Camera, or WiFi hotspot, for example.

In view of the foregoing, some embodiments disclosed herein may have the advantage of providing inductive power, on the order of 10-150 Watts for example, and inductive high speed data communication, on the order of RS232/485 230 kbps and Ethernet 80 Mbps for example, to an electronic device disposed in a removable panel pivotally attached to a vehicle, thereby enabling ease of removal and replacement of the panel without the need to couple and uncouple electrical wires from a wiring harness.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle, comprising:
   a removable panel comprising an electronic device;
   wherein the removable panel of the vehicle is: a tailgate; a door; a roof; a trunk lid; a lift gate; a convertible top; a headrest; or, a hood
   a power source;
   a data source; and
   a connector configured to selectively couple the removable panel to the vehicle, the connector configured to be electrically coupled to the power source and the data source, and further configured to inductively couple the electronic device of the removable panel to the power source and the data source.

2. The vehicle of claim 1, wherein:
   the removable panel is pivotally attached to the vehicle via a hinge; and
   the connector is disposed at the hinge.

3. The vehicle of claim 1, wherein the connector comprises:
   a first connecting element coupled to the vehicle;
   a first coil wrapped around the first connecting element;
   a first modulator-demodulator disposed in signal communication with the first coil, and disposed to receive power from the power source and data from the data source;
   a second connecting element coupled to the removeable panel;
   a second coil wrapped around the second connecting element; and
   a second modulator-demodulator disposed in signal communication with the second coil, and disposed to provide power and data to the electronic device.

4. The vehicle of claim 3, wherein the connector further comprises:
a first amplifier disposed in signal communication between the first modulator-demodulator and the first coil; and
a second amplifier disposed in signal communication between the second modulator-demodulator and the second coil.

5. The vehicle of claim 3, wherein one of the first connecting element and the second connecting element comprises a ferrous material.

6. The vehicle of claim 3, further comprising an interface associated with one of the first connecting element and the second connecting element, the interface comprising a ferrous material, wherein a respective one of the first coil and the second coil is wrapped around the interface.

7. The vehicle of claim 1, wherein:
the electronic device comprises: a camera; a proximity sensor; a light; or, a switch.

8. A connector adapted to selectively couple a moveable panel having an electronic device to a vehicle having a power source and a data source, the connector comprising:
a first connecting element adapted to be coupled to the vehicle, the first connecting element comprising a first coil adapted to inductively couple the electronic device to the power source and the data source, and a first modulator-demodulator disposed in signal communication with the first coil and adapted to receive power from the power source and data from the data source;
a second connecting element adapted to be coupled to the moveable panel, the second connecting element comprising a second coil adapted to inductively couple the electronic device to the power source and the data source, and a second modulator-demodulator disposed in signal communication with the second coil and adapted to provide power and data to the electronic device.

9. The connector of claim 8, further comprising:
a first amplifier disposed in signal communication between the first modulator-demodulator and the first coil; and
a second amplifier disposed in signal communication between the second modulator-demodulator and the second coil.

10. The connector of claim 8, wherein one of the first connecting element and the second connecting element comprises a ferrous material.

11. The connector of claim 8, further comprising an interface associated with one of the first connecting element and the second connecting element, the interface comprising a ferrous material, wherein a respective one of the first coil and the second coil is wrapped around the interface.

12. A vehicle, comprising:
a movable panel comprising an electronic device;
a power source;
a data source; and
a connector configured to selectively couple the movable panel to the vehicle, the connector configured to be electrically coupled to the power source and the data source, and further configured to inductively couple the electronic device of the movable panel to the power source and the data source;
the connector further comprising:
a first connecting element coupled to the vehicle, the first connecting element comprising a first coil adapted to inductively couple the electronic device to the power source and the data source, and a first modulator-demodulator disposed in signal communication with the first coil and adapted to receive power from the power source and data from the data source;
a second connecting element coupled to the moveable panel, the second connecting element comprising a second coil adapted to inductively couple the electronic device to the power source and the data source, and a second modulator-demodulator disposed in signal communication with the second coil and adapted to provide power and data to the electronic device.

* * * * *